(12) United States Patent
Fujieda et al.

(10) Patent No.: US 9,223,032 B2
(45) Date of Patent: Dec. 29, 2015

(54) COMPOSITION FOR REFLECTIVE FILM, REFLECTIVE FILM, AND X-RAY DETECTOR

(71) Applicant: TOSHIBA ELECTRON TUBES & DEVICES CO., LTD., Otawara-shi (JP)

(72) Inventors: Shinetsu Fujieda, Kawasaki (JP); Katsuhisa Homma, Otawara (JP); Akiko Suzuki, Tokyo (JP); Tatsuoki Kono, Tokyo (JP)

(73) Assignee: TOSHIBA ELECTRON TUBES & DEVICES CO., LTD., Otawara-shi (JP)

(*) Notice: Subject to any disclaimer, the term of this patent is extended or adjusted under 35 U.S.C. 154(b) by 0 days.

(21) Appl. No.: 14/244,950

(22) Filed: Apr. 4, 2014

(65) Prior Publication Data

US 2014/0217296 A1   Aug. 7, 2014

Related U.S. Application Data

(62) Division of application No. 13/003,711, filed as application No. PCT/JP2009/062672 on Jul. 13, 2009.

(30) Foreign Application Priority Data

Jul. 11, 2008 (JP) ................. 2008-181122

(51) Int. Cl.
   C08K 5/15 (2006.01)
   C08K 5/1515 (2006.01)
   G01T 1/20 (2006.01)
   C08K 3/22 (2006.01)
   C08K 5/5435 (2006.01)
   C09D 5/33 (2006.01)
   C09D 7/12 (2006.01)

(52) U.S. Cl.
   CPC ............. *G01T 1/2002* (2013.01); *C08K 3/22* (2013.01); *C08K 5/1515* (2013.01); *C08K 5/5435* (2013.01); *C09D 5/004* (2013.01); *C09D 7/1216* (2013.01); *C09D 7/1266* (2013.01); *C09D 7/1275* (2013.01); *C09D 7/1283* (2013.01)

(58) Field of Classification Search
   CPC ...... C08K 3/22; C08K 5/1515; C08K 5/5435; C08L 29/14; C09D 5/004; C09D 7/1216; C09D 7/1266; C09D 7/1275; C09D 7/1283; G01T 1/2002
   See application file for complete search history.

(56) References Cited

U.S. PATENT DOCUMENTS

| 6,130,025 | A | 10/2000 | Chikaoka et al. |
| 6,423,463 | B1 | 7/2002 | Oota et al. |
| 6,844,124 | B2 | 1/2005 | Ikuno et al. |
| 2004/0157078 | A1* | 8/2004 | Yoshida ............... 428/524 |
| 2004/0157162 | A1 | 8/2004 | Yokota et al. |
| 2005/0111613 | A1 | 5/2005 | Mliner et al. |
| 2006/0240356 | A1 | 10/2006 | Sugano et al. |
| 2007/0023666 | A1 | 2/2007 | Kobusch |
| 2007/0207396 | A1 | 9/2007 | Wu et al. |
| 2007/0292805 | A1 | 12/2007 | Miura et al. |
| 2008/0023881 | A1 | 1/2008 | Kubo |
| 2008/0219694 | A1 | 9/2008 | Nakamori et al. |

FOREIGN PATENT DOCUMENTS

| JP | 61 221219 | 10/1986 |
| JP | 3077941 | 6/2000 |
| JP | 3405706 | 3/2003 |
| JP | 2005 189234 | 7/2005 |
| JP | 2006 28522 | 2/2006 |

OTHER PUBLICATIONS

International Search Report issued Aug. 4, 2009 in PCT/JP09/62672 filed Jul. 13, 2009.

* cited by examiner

*Primary Examiner* — Ling Choi
*Assistant Examiner* — Marie Reddick
(74) *Attorney, Agent, or Firm* — Oblon, McClelland, Maier & Neustadt, L.L.P.

(57) ABSTRACT

Provided is a composition for reflective film comprising a polyvinyl acetal resin, an epoxidized vegetable oil, a solvent, a coupling agent and titanium oxide.

14 Claims, 1 Drawing Sheet

COMPOSITION FOR REFLECTIVE FILM, REFLECTIVE FILM, AND X-RAY DETECTOR

This application is a divisional of U.S. application Ser. No. 13/003,711 filed Jan. 11, 2011, incorporated herein by reference, which is a National Stage of PCT/JP2009/062672 filed Jul. 13, 2009 and claims the benefit of JP 2008-181122 filed Jul. 11, 2008.

BACKGROUND OF THE INVENTION

1. Field of the Invention

The present invention relates to a composition for reflective film, a reflective film, and an X-ray detector.

2. Related Art

There has been developed a planar detector using an active matrix, as a detector for X-ray analysis of a new generation. In such a planar detector, when the irradiated X-ray is detected, captured X-ray images or real-time X-ray images are output in the form of digital signals.

Specifically, an image is obtained by converting X-rays into fluorescence by a scintillator layer, and converting this fluorescence into signal charges with a photoelectric conversion element such as an amorphous silicon (a-Si) photodiode or a charge coupled device (CCD).

Here, in order to enhance the resolution characteristics, there are available a technology for forming grooves in the scintillator layer by dicing or the like, and a technology for forming the scintillator layer in the form of a pillar-shaped structure by deposition according to a vapor deposition method.

Furthermore, in order to enhance the sensitivity characteristics by increasing the use efficiency of the fluorescence from the scintillator layer, there is known a technology of forming a reflective film on the scintillator layer, reflecting the fluorescence radiated to the side opposite to the photoelectric conversion element side, and thereby increasing the light that arrives at the photoelectric conversion element side (see, for example, Patent Documents 1 and 2).

As the method for forming such a reflective film, a method of forming a film on the scintillator layer using a metal having a high fluorescence reflection ratio, such as a silver alloy or aluminum a method of applying a diffusion reflective material composed of a light scattering substance such as titanium oxide, a binder resin and a solvent, on the scintillator layer; and the like are generally known.

However, in the method of applying the diffusion reflective material, the reflective film shrinks to generate stresses in the substrate as the solvent is removed after the application. As a result, warpage of the substrate or peeling of the scintillator layer and the reflective film from the substrate occurs, and there is a risk that the luminance and resolution may be lowered. This tendency tends to be noticeably exhibited as the size of the substrate increases, and therefore, it is difficult in the conventional methods to deal with large-sized substrates.

In the method of applying the diffusion reflective material, since the binder resin is filled in the gaps between the light scattering substances such as titanium oxide, the light scattering effect of the light scattering substance having a high refractive index may be drastically reduced. That is, for example, in regard to the magnitude of the angle of refraction at the interface between titanium oxide (refractive index 2.7) and the atmosphere (refractive index 1.0) caused by the difference between the refractive indices, since the difference between the refractive indices of titanium oxide (refractive index 2.7) and the binder resin (refractive index approximately 1.6) is small, the angle of refraction at the interface per round is decreased. The reflection by a light scatter is achieved as the direction of light travel randomly changes the direction as a result of repeated reflection at the interface between the light scatter and the neighboring substance, and thereby the light scatter successfully performs the role as a diffusion reflector. Thus, a decrease in the angle of refraction at the interface ends up with an increase in the number of refractions required by the direction of light travel to change the direction randomly. In other words, this means that it takes a circuitous route for the fluorescence radiated from the scintillator to change the direction in the same manner. This circuitous route makes the fluorescence radiated from the scintillator to affect both the extension in the thickness direction and the extension in the plane direction of the reflective film. As a result, the circuitous route leads to an intensification of a decrease in the resolution due to an increase in the crosstalk between the pixels, or to a reduction in the fluorescence radiated from the scintillator inside the reflective film, thus bringing about a decrease in the luminance.

RELATED ART DOCUMENTS

Patent Documents

Patent Document 1: Japanese Patent No. 3077941
Patent Document 2: Japanese Patent No. 3405706

SUMMARY OF THE INVENTION

Problems to be Solved by the Invention

The present invention was made in order to solve the problems described above. That is, it is an object of the invention to provide a composition for reflective film and a reflective film, which can suppress the warpage of a member to have a reflective film formed thereon, and the peeling of the reflective film from the member to have a reflective film formed thereon. It is another object of the invention to provide an X-ray detector which can suppress decreases in the luminance and resolution.

Means for Solving the Problems

According to an embodiment of the present invention, there is provided a composition for reflective film containing a polyvinyl acetal resin, an epoxidized vegetable oil, a solvent, a coupling agent and titanium oxide.

According to another embodiment of the present invention, there is provided a reflective film characterized by being formed using the composition for reflective film.

According to another embodiment of the present invention, there is provided an X-ray detector which includes a substrate, a photoelectric conversion element which is formed on the substrate and which converts incident light to signal charges, a scintillator layer which is formed on the photoelectric conversion element and which converts incident X-ray to fluorescence, and a reflective film which is formed on the scintillator layer using the composition for reflective film according to claim 1, and which reflects the fluorescence radiated from the scintillator layer.

Effects of the Invention

Regarding the composition for reflective film according to an embodiment of the present invention, the composition contains an epoxidized vegetable oil and can therefore decrease the elastic modulus of the reflective film. Thereby, the stress in the member to have a reflective film formed thereon, which is generated when this composition for reflective film is applied on the member to have a reflective film formed thereon and the solvent is removed, can be relaxed. Thereby, warpage of the member to have a reflective film formed thereon, and peeling of the reflective film from the member to have a reflective film formed thereon can be suppressed.

Regarding the reflective film according to another embodiment of the present invention, since the reflective film is formed using the composition for reflective film, the warpage of the member to have a reflective film formed thereon, and the peeling of the reflective film from the member to have a reflective film formed thereon can be suppressed.

Regarding the X-ray detector according to another embodiment of the present invention, the X-ray detector has a reflective film formed thereon using the composition for reflective film, and can therefore suppress the warpage of the substrate or the peeling of the scintillator layer. Thereby, decreases in the luminance and resolution can be suppressed. Furthermore, the moisture-proofing property of the scintillator layer and the surface smoothness can be enhanced.

DETAILED DESCRIPTION OF THE INVENTION

First Embodiment

Figure 1:
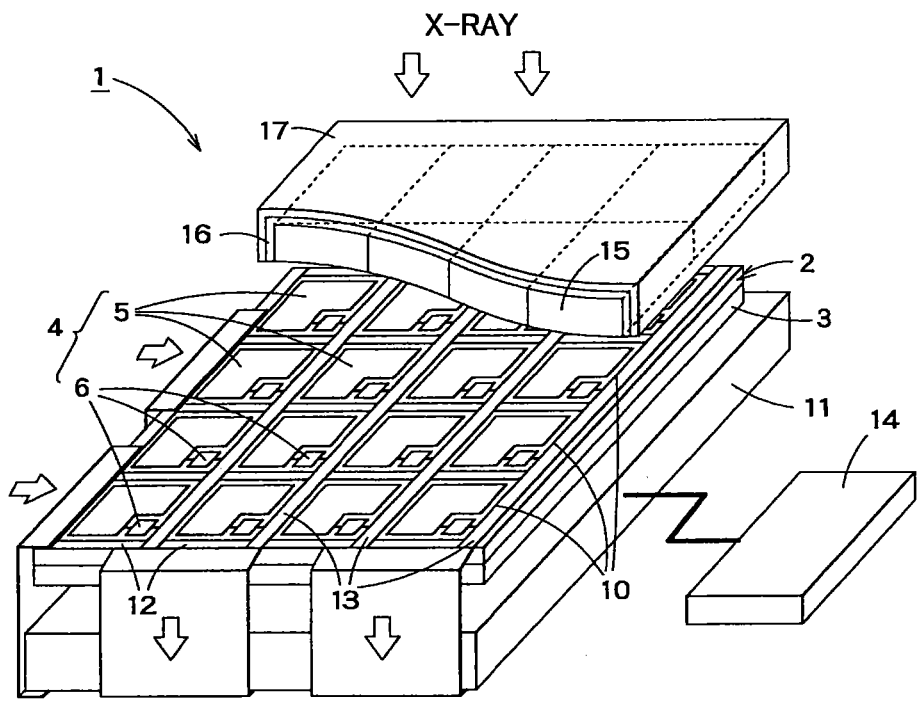
FIG. 1 is a construction diagram for an X-ray detector according to a second embodiment.

Hereinafter, a first embodiment of the present invention will be explained. The composition for reflective film according to the current embodiment is constituted to mainly include a polyvinyl acetal resin, an epoxidized vegetable oil, a solvent, a coupling agent and titanium oxide.

Polyvinyl Acetal Resin

Examples of the polyvinyl acetal resin include a polyvinyl butyral resin, a polyvinyl formal resin, a polyvinyl acetoacetal resin, a polyvinyl propianal resin, and a polyvinyl hexylal resin. Among these, a polyvinyl butyral resin is excellent in view of water resistance and film forming property. Furthermore, the polyvinyl butyral resin is also excellent from the viewpoint that cracks do not easily occur in the film, and a high quality reflective film can be formed.

Any polymer that is obtained by adding butyl aldehyde to polyvinyl alcohol in the presence of an acid catalyst can be used as the polyvinyl butyral resin. Furthermore, a polymer of the type copolymerized with vinyl acetate or vinyl alcohol can also be used.

Specific examples of the polyvinyl butyral resin include S-LEC BL-1, BL-1H, BL-2, BL-5, BL-10, BL-S, BL-SH, BX-10, BX-L, BM-1, BM-2, BM-5, BM-S, BM-SH, BH-3, BH-6, BH-S, BX-1, BX-3, BX-5, KS-10, KS-1, KS-3 and KS-5 (all trade names, manufactured by Sekisui Chemical Co., Ltd.). The polyvinyl butyral resin can be appropriately selected therefrom in consideration of the compatibility with the epoxy resin and the resin viscosity.

Among the polyvinyl butyral resins, it is preferable that the weight average molecular weight of the polyvinyl butyral resin be $3 \times 10^4$ or greater, from the viewpoint of crack resistance and film forming property. The reason why a weight average molecular weight of $3 \times 10^4$ or greater is preferable is that when the weight average molecular weight is less than this value, the peelability after film formation and the crack resistance are decreased.

The polyvinyl acetal resin is preferably contained in the composition for reflective film at a proportion of 1% to 50% by weight, and particularly preferably 5% to 30% by weight. This range is preferable because if the concentration is less than 1% by weight, the film forming property is decreased, and the peelability after film formation and the crack resistance are also noticeably decreased. It is also because if the concentration is greater than 50% by weight, the amount of incorporation of titanium oxide is decreased, and the luminance and resolution required of the reflective film are also decreased.

Epoxidized Vegetable Oil

The epoxidized vegetable oil is preferably an oil in which the saturated double bonds in the structural chain have been internally epoxidized. Specifically, epoxidized linseed oil, epoxidized tung oil and epoxidized soybean oil are particularly preferred, and in particular, epoxidized linseed oil is preferable in view of heat resistance and water resistance.

The epoxidized vegetable oil is preferably contained in the composition for reflective film at a proportion of 0.5% to 30% by weight, and particularly preferably 1% to 20% by weight. This range is preferable because if the concentration is less than 0.5% by weight, the peelability after film formation and the crack resistance are decreased, and if the concentration is greater than 30% by weight, the strength of the reflective film is reduced, while deterioration in the external appearance of the reflective film surface occurs repeatedly.

Furthermore, in consideration of the warpage of the member to have a reflective film formed thereon, it is preferable that the epoxidized linseed oil have a modification ratio of 30% by weight or greater, and particularly preferably a modification ratio of 10% to 70% by weight, with respect to the polyvinyl acetal resin.

The epoxidized linseed oil preferably has an oxirane oxygen content of 5% or greater, and particularly preferably 6% to 10%. An oxirane oxygen concentration of 5% or greater is preferable because if the oxirane oxygen concentration is less than this value, double bonds remain behind in the structural chain, and there is a risk that an oxygen-induced crosslinking reaction may proceed at room temperature, causing a decrease in the storage stability.

Solvent

In regard to the solvent, any substance such as an alcohol-based solvent, a ketone-based solvent, a cellosolve-based solvent, an ester-based solvent, an amide-based solvent, an aromatic-based solvent or an ether-based solvent can be used, as long as the solvent can uniformly dissolve and liquefy the polyvinyl acetal resin and the epoxidized vegetable oil. However, among these, a non-aqueous solvent is particularly preferred because such a non-aqueous solvent can suppress as much as possible the moisture-induced deterioration of the scintillator layer that will be described later. Specifically, particularly preferred examples of the solvent include cyclohexanone, methylcyclohexanone, toluene and xylene, and two or more kinds of solvents can also be used in mixture. In addition, it is needless to say that the solvent can be appropriately selected for use in view of film forming property and workability.

Coupling Agent

The coupling agent may be, for example, an epoxysilane coupling agent. Examples of the epoxysilane coupling agent include 2-(3,4-epoxycyclohexyl)ethyltrimethoxysilane, 3-glycidyloxypropyl(dimethoxy)methylsilane, 3-glycidyloxypropyltrimethoxysilane, 3-glycidyloxypropyltriethoxysilane, 3-glycidyloxypropylmethyldimethoxysilane, and diethoxy(3-glycidyloxypropyl)methylsilane.

Titanium Oxide

Titanium oxide is a component intended to impart a light reflecting performance. In regard to the crystalline structure of titanium oxide, any of rutile type and anatase type may be used; however, the rutile type is preferred from the viewpoint that it has a large ratio of refractive index with respect to the resin and can achieve high luminance.

Specific examples of titanium oxide include CR-50, CR-50-2, CR-57, CR-80, CR-90, CR-93, CR-95, CR-97, CR-60-2, CR-63, CR-67, CR-58, CR-58-2 and CR-85 produced by a hydrochloric acid method; R-820, R-830, R-930, R-550, R-630, R-680, R-670, R-580, R-780, R-780-2, R-850, R-855, A-100, A-220 and W-10 produced by a sulfuric acid method (all trade names, manufactured by Ishihara Sangyo Kaisha, Ltd.). Furthermore, it is particularly preferable that the titanium oxide be surface treated with an oxide of Al, Si or the like, so as to enhance the affinity with the polymers and dispersibility, or to suppress the deterioration of the polymers.

Titanium oxide is preferably contained in the composition for reflective film at a proportion of 50% to 98% by weight, and particularly preferably 70% to 95% by weight. This range is preferable because if the concentration is less than 50% by weight, the luminance and resolution required of the reflective film are decreased, and if the concentration is greater than 98% by weight, workability during film formation is noticeably decreased, and the adhesiveness to the substrate is decreased, making the reflective film susceptible to loss.

When a reflective film is formed by using light scattering particles of titanium oxide or the like, as the ratio between the refractive index of the light scattering particles and the refractive index of the surrounding material is increased, the angle of light scattering due to each of the particles is increased, so that the reflection effect of plural light scattering particles can be easily obtained even in a small region. Furthermore, as the particle size of the light scattering material particles is decreased, the number of light scattering particles that are filled in a unit volume is increased, and therefore, the reflection effect can be easily obtained in a small region. However, if the particle size of the light scattering particles becomes as small as approximately 1/10 or less of the fluorescence wavelength, the effect of refracting fluorescence is reduced. Therefore, in order to secure the reflection effect in a smaller region, the average particle size of the titanium oxide is preferably about 10-fold to 1/10-fold the fluorescence wavelength. Specifically, the average particle size of the titanium oxide is preferably, for example, 5 µm or less. In addition, the "average particle size" is defined as the value obtained based on the method for measuring a single particle diameter using an electron microscope.

Other Additives

In order to reduce any stress that is generated, a thermal thermoplastic resin, a rubber component, various oligomers and the like may be added to the composition for reflective film, in addition to the components described above, for the purpose of lowering the elastic modulus of the composition.

Examples of the thermoplastic resin include a polyamide resin, an aromatic polyester resin, a phenoxy resin, an MBS resin, and an ABS resin. Furthermore, the thermoplastic resin can be modified with a silicone oil, a silicone resin, a silicone rubber, or a fluororubber or the like. Furthermore, it is also possible to impart a stress reducing property by adding various plastic powders, various high-performance plastic powders and the like. The maximum particle size of the component that imparts a stress reducing property is preferably 10 µm or less, and particularly preferably 5 µm or less.

Furthermore, in order to maintain the shape of the reflective film and in order to enhance the performance of the reflective film, it is possible to use a fine inorganic filler having a small X-ray absorption. Specifically, for example, a silica filler is preferred, and a silica having a particle size of 40 nm or less is particularly preferred. Specific examples include Aerosil 130, Aerosil 200, Aerosil 200V, Aerosil 200CF, Aerosil 200FAD, Aerosil 300, Aerosil 300CF, Aerosil 380, Aerosil R972, Aerosil R972V, Aerosil R972CF, Aerosil R974, Aerosil R202, Aerosil R805, Aerosil R812, Aerosil R812S, Aerosil OX50, Aerosil TT600, Aerosil MOX80, Aerosil MOX170, Aerosil COK84, Aerosil RX200, and Aerosil RY200 (all trade names, manufactured by Nippon Aerosil Co., Ltd.).

In order to obtain an effect of strengthening the crack resistance of the reflective film, it is possible to use a fibrous filler in combination. Examples of the fibrous filler include whiskers such as titania, aluminum borate, silicon carbide, silicon nitride, potassium titanate, basic magnesium, zinc oxide, graphite, magnesia, calcium sulfate, magnesium borate, titanium diboride, α-alumina, chrysotile and wollastonite; amorphous fibers such as E glass fiber, silica alumina fiber and silica glass fiber; and crystalline fibers such as Tyranno fiber, silicon carbide fiber, zirconia fiber, (-alumina fiber, (-alumina fiber, PAN-based carbon fiber and pitch-based carbon fiber. These fibrous filler materials are such that a filler material having an average fiber diameter of 5 (m or less and a maximum fiber length of 10 (m or less is preferred from the viewpoint of the uniformity of the coating film.

Moreover, a tackifying agent for enhancing the adhesiveness of the reflective film to the member to have a reflective film formed thereon, or a surfactant or defoaming agent for enhancing the performance of the reflective film can also be incorporated. It is also possible to add a reactive low molecular weight epoxy resin or the like as a viscosity adjusting agent.

The composition for reflective film of the present embodiment can be produced, for example, in the manner described below. First, a predetermined amount of a solvent is measured into a mixing vessel. Then, a polyvinyl acetal resin and an epoxidized vegetable oil as resin components are introduced into this mixing vessel, and the mixture is uniformly heated and dissolved using a solvent.

Subsequently, titanium oxide and a coupling agent are introduced into the mixing vessel and are uniformly mixed with the resin components by using a triple-roll, a ball mill, a kneading machine, a homogenizer, a planetary mixing apparatus, a universal mixer, an extruder or the like. Thereby, the composition for reflective film of the present embodiment can be produced.

The composition for reflective film thus produced is applied on a member to have a reflective film formed thereon, by a generally used coating method such as, for example, area coating using a dispenser, application according to a screen printing method, or application with a brush, and then the solvent is removed by standing at normal temperature or by drying using a drying furnace. Thereby, a reflective film is formed.

According to the present embodiment, since the composition for reflective film contains an epoxidized vegetable oil, the elastic modulus of the reflective film can be decreased. Thereby, even when this composition for reflective film is applied on a member to have a reflective film formed thereon, such as a substrate, and the solvent is removed, the stress of the member to have a reflective film formed thereon can be relaxed. Therefore, warpage of the member to have a reflective film formed thereon, and peeling of the reflective film from the member to have a reflective film formed thereon can be suppressed.

Furthermore, when the composition for reflective film is used as a reflective film for an X-ray detector, the adhesiveness to the substrate can be enhanced, and therefore, the generation of cracks can be suppressed, while the moisture resistance of the scintillator layer can be enhanced to a large extent.

According to the present embodiment, a composition for reflective film which is excellent in the performance of the reflective film, adhesiveness and storage stability, can be provided.

In addition, the composition for reflective film according to the present embodiment can be used for the reflective film of an X-ray detector such as shown in a second embodiment, but as long as the use is limited to a use as a reflective film, the composition can also be used for a reflective film other than the reflective film of an X-ray detector.

Second Embodiment

Hereinafter, a second embodiment of the present invention will be explained with reference to the drawings. In the present embodiment, an example of using the composition for reflective film explained in the first embodiment in the reflective film of an X-ray detector, will be explained. FIG. 1 is a schematic constitutional diagram for an X-ray detector according to the second embodiment, and FIG. 2 is a vertical cross-sectional view of the X-ray detector according to the second embodiment.

Figure 2:
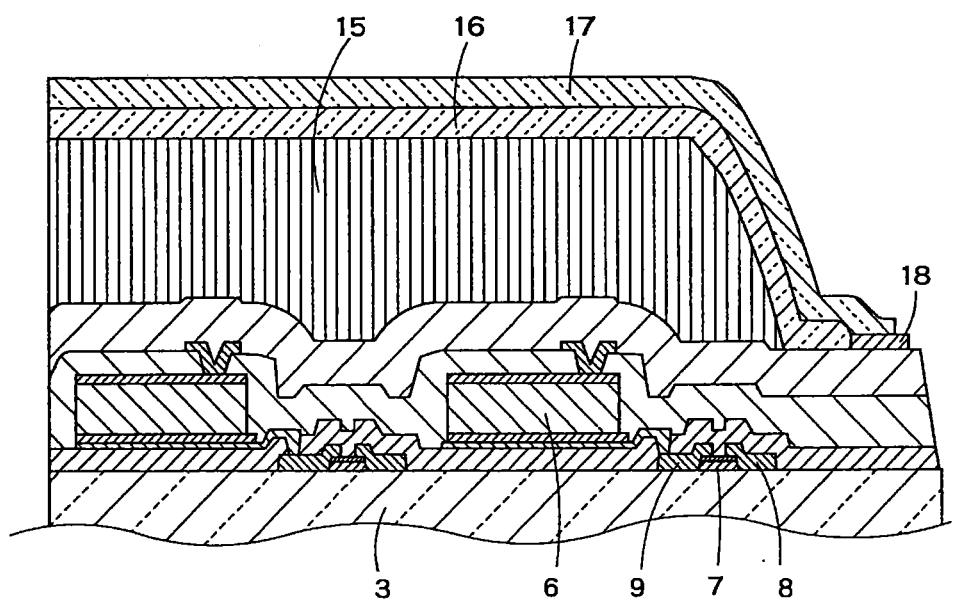
FIG. 2 is a vertical cross-sectional view of the X-ray detector according to the second embodiment.

The X-ray detector 1 shown in FIGS. 1 and 2 is an X-ray planar sensor that detects X-ray images, and can be used in, for example, general medical applications and the like. The X-ray detector 1 comprises an array substrate 2. The array substrate 2 is an active matrix TFT array.

The array substrate 2 comprises a glass substrate 3, which is an insulating substrate having translucency. On the surface of the glass substrate 3, plural detection element array units 4 having a roughly rectangular shape, which are intended for the detection of X-rays, are disposed in a matrix form. The detection element array unit 4 is mainly composed of a photodiode 5 as a photoelectric conversion element, which has a roughly L-shaped plate form and converts the incident light into signal charges, and a thin film transistor (TFT) 6 which functions as a switching element.

The photodiode 5 is formed in each of the pixels, as a pn diode structure or pin diode structure of amorphous silicon (a-Si). The photodiode 5 is electrically connected to the thin film transistor 6.

The thin film transistor 6 is at least partially composed of amorphous silicon as a non-crystalline semiconductor, which is a semiconductor material having crystallinity. Furthermore, each of these thin film transistors 6 accumulates and releases the charge generated in the photodiode 5. The thin film transistors 6 individually comprise a gate electrode 7, a source electrode 8 and a drain electrode 9.

The glass substrate 3 has plural pixels 11, each having the same structure, formed by plural detection element array unit 4. The pixels 11 are two-dimensionally arranged at a predetermined interval respectively in the row direction, which is a horizontal direction, and in the column direction, which is a vertical direction. Each of the pixels 11 is mainly composed of the photodiode 5 and the thin film transistor 6.

On the rear surface side of the glass substrate 3, there is mounted a high speed signal processing unit 11 which controls the operation state of each thin film transistor 6, for example, the on/off status of each thin film transistor 6. The high speed signal processing unit 11 functions as a line driver which serves as a signal processing circuit intended for controlling the readout of signals or for processing the read signals.

The high speed signal processing unit 11 is electrically connected to plural control lines 12 at their one-side terminals. The control line 12 is used to control the on/off status of the thin film transistor 6. The control lines 12 are disposed along the row direction of the glass substrate 3, and are installed between the respective pixels 11 on the glass substrate 3. Furthermore, each of the control lines 12 is electrically connected to the gate electrode 7 of the thin film transistor 6 that constitutes each pixel 11 of the same row.

Furthermore, the high speed processing unit 11 is electrically connected to plural data lines 13 at their one-side terminals. The data line 13 is used to receive image data signals from the thin film transistor 6 that constitutes each pixel 11 of the same column. The data lines 13 are disposed along the column direction of the glass substrate 3, and are installed between the respective pixels 11 on the glass substrate 3. Furthermore, each of the data lines 13 is electrically connected to the source electrode 8 of the thin film transistor 6 that constitutes each pixel 11 of the same column.

Furthermore, the high speed processing unit 11 is electrically connected to a digital image transmission unit 14. The digital image transmission unit 14 is mounted on the array substrate 2 in a state of being drawn to the outside.

On the glass substrate 3, there is formed a scintillator layer 15 that converts the incident X-ray into fluorescence. The scintillator layer 15 has a pillar-shaped structure having plural pillar-shaped units. Specifically, the pillar-shaped units can be formed by using, for example, cesium iodide (CsI) and thallium (Tl) or using sodium iodide (NaI) and thallium (Tl), and depositing the compounds on the glass substrate 3 by a vacuum deposition method. More specifically, the scintillator layer 15 can be constructed from a deposition film of CsI and Tl having a film thickness of about 600 μm, in which the width of the pillar-shaped unit is about 8 to 12 μm at the outermost surface.

Furthermore, it is also possible to form the pillar-shaped units by mixing gadolinium oxysulfide ($Gd_2O_2S$) phosphor particles with a binder resin, applying the mixture on the array substrate 2, calcining or hardening the mixture, and forming the groove part through dicing.

The gaps between the pillar-shaped units are filled with air or an inert gas such as nitrogen ($N_2$) for the prevention of oxidation. These gaps can also be retained in a vacuum state.

A reflective film 16 is formed on the scintillator layer 15. The reflective film 16 reflects the fluorescence radiated from the scintillator layer 15 to the opposite side of the photodiode 5, and thereby increases the amount of fluorescence light that reaches the photodiode 5.

The reflective film 16 is formed using the composition for reflective film explained in connection with the first embodiment. The formation of the reflective film 16 can be carried out by forming the reflective film on the scintillator layer 15 by methods such as brush coating, blade coating, dispenser coating, contact metal screen printing or the like, and leaving the film to stand at ambient temperature or drying the film in a drying furnace.

The film thickness of the reflective film 16 is preferably 10 to 800 μm. It is because if the film thickness of the reflective film 16 is less than 10 μm, sufficient luminance and resolution cannot be obtained, and if the thickness is greater than 800 μm, the large thickness causes decreases in the smoothness of the surface of the reflective film 16 and workability.

The scintillator layer 15 and the reflective film 16 are made moisture-proof by a moisture-proofing structure so that the deterioration of properties caused by moisture absorption of the scintillator layer 15 is suppressed. The moisture-proofing structure includes a structure that seals by covering the scintillator layer 15 and the reflective film 16 with (1) a moisture-proof layer such as a metal laminate film, a metal foil, or a laminate sheet of an inorganic film and an organic film, or with (2) a moisture-proofing member composed of a moisture-proof body having a high water vapor barrier, such as a glass plate, and a frame disposed at the periphery of the scintillator layer 15, and adhering the edges of the moisture-proof layer or the moisture-proofing member with a sealing agent.

According to the present embodiment, an example in which a moisture-proof layer 17 is formed on the reflective layer 16 will be explained. The moisture-proof layer 17 can be formed of a metal, glass, a resin or the like, but from the viewpoint of processability and moisture-proofing performance, a metal processed into a cap shape is preferred. Among metals, a light metal having the smallest possible absorption of X-rays is preferred, and particularly in view of processability, aluminum and its alloys, and the like are preferred. Specifically, for example, an aluminum alloy foil having a thickness of 80 μm which has been processed into a cap shape may be used. In order to process the moisture-proof layer 17 into a cap shape, it is preferable to perform pressing the moisture-proof layer in the absence of wrinkles at the edges.

At the edges of the moisture-proof layer 17, a sealing agent 18 that suppresses the penetration of moisture from the edges of the moisture-proof layer 17 is formed. The working atmosphere during the formation of the sealing agent 18 is particularly preferably a clean room which has a low humidity and is humidity-regulated. The formation of the sealing agent 18 is suitably carried out by brush coating, blade coating, dispenser coating, contact metal screen printing or the like.

In order to cure the sealing agent 18, it is preferable to subject the sealing agent to UV irradiation or thermal curing while pressing the areas to be sealed. This pressing is preferably carried out at 0.5 kgf/cm² or greater, and the UV irradiation is preferably carried under the conditions of, for example, 4 J/cm² or greater at 365 nm, from the viewpoint of obtaining uniform sealability and moisture-proofing property.

The operation of the X-ray detector 1 will be explained. First, an X-ray sequentially penetrates through the moisture-proof layer 17 and the reflective film 16, and enters the scintillator layer 15. The X-ray that has entered the scintillator layer 15 is converted to fluorescence by the scintillator layer 15, and fluorescence is radiated from the scintillator layer 15. Here, the fluorescence radiated to the side of the photodiode 5 directly enters the photodiode 5, and the fluorescence radiated to the opposite side of the photodiode 5 is reflected by the reflective film 16 and enters the photodiode 5.

The fluorescence entering the photodiode 5 is converted to signal charges, and the signal charges are read out at each pixel unit by the thin film transistor 6 and are transmitted to the high speed signal processing unit 11 via the data line 13. Then, the signal charges are subjected to imaging processing by the high speed image processing unit 11, and the data is transmitted to the digital image transmission unit 14.

According to the present embodiment, since the reflective film 16 is formed using the composition for reflective film explained in connection with the first embodiment, the warpage of the glass substrate 3 or the peeling of the scintillator layer 15 can be suppressed. Thereby, decreases in the luminance and resolution can be suppressed.

EXAMPLES

Hereinafter, Examples of the invention will be described. In the present Examples, samples of various compositions for reflective film were produced, and the samples were used to perform various tests. The constitutions of the compositions for reflective film of Examples 1 to 10 and Comparative Examples 1 and 2 are presented in Table 1. In addition, the units for the values in Table 1 are all expressed in parts by weight.

TABLE 1

| | Example 1 | Example 2 | Example 3 | Example 4 | Example 5 | Example 6 | Example 7 | Example 8 | Example 9 | Example 10 | Comparative Example 1 | Comparative Example 2 |
|---|---|---|---|---|---|---|---|---|---|---|---|---|
| Polyvinyl butyral resin A | 4.2 | 3.6 | 3 | 4.2 | 3.6 | 3 | — | — | — | 3 | 6 | — |
| Polyvinyl butyral resin B | — | — | — | — | — | — | 3 | 3 | — | — | — | 6 |
| Polyvinyl butyral resin C | — | — | — | — | — | — | — | — | 3 | — | — | — |
| Epoxidized linseed oil A | 1.8 | 2.4 | 3 | — | — | — | 3 | — | 3 | — | — | — |
| Epoxidized linseed oil B | — | — | — | — | — | — | — | — | — | 3 | — | — |
| Epoxidized soybean oil | — | — | — | 1.8 | 2.4 | 3 | — | 3 | — | — | — | — |
| Cyclohexanone | 46 | 46 | 46 | 46 | 46 | 46 | 46 | 46 | 46 | 46 | 46 | 46 |
| Titanium oxide A | 50 | 50 | 50 | 50 | 50 | 50 | 50 | — | 50 | 50 | 50 | 50 |
| Titanium oxide B | — | — | — | — | — | — | — | 50 | — | — | — | — |
| Coupling agent | 0.15 | 0.15 | 0.15 | 0.15 | 0.15 | 0.15 | 0.15 | 0.15 | 0.15 | 0.15 | 0.15 | 0.15 |

Samples

Example 1

First, in a flask equipped with a stirring device, in which cyclohexanone (manufactured by Kanto Chemical Co., Inc.) had been introduced, a polyvinyl butyral resin A (trade name: "S-LEC BH-S", manufactured by Sekisui Chemical Co., Ltd.; molecular weight $6.6 \times 10^4$) was introduced in four divided portions, and the mixture was dispersed at a rate of 600 rotations/minute. Subsequently, an epoxidized linseed oil A (trade name: "0-180P", manufactured by Adeka Corp.; oxirane oxygen content 9.1%) was added to the flask, and the mixture was mixed under heating at 60° C. Thereby, the presence of a foreign matter was confirmed, and thus a transparent uniform binder was produced. Furthermore, a rutile type titanium oxide A (trade name: "CR-50", manufactured by Ishihara Sangyo Kaisha, Ltd.; average particle size 0.25 μm), a coupling agent (trade name: "Z-6040", manufactured by Dow Corning Toray Co., Ltd.; 3-glycidoxypropyltrimethoxysilane) were added to the flask, and the mixture was uniformly mixed for 3 minutes using a planetary mixing machine at a rate of 400 rotations/minute and at a rate of 2000 revolutions/minute. Finally, the mixture was mixed with a triple-roll at a rate of 200 rotations/minute, and thus a composition for reflective film of Example 1 was prepared.

Examples 2 and 3

Compositions for reflective film were prepared in the same manner as in Example 1. However, in Examples 2 and 3, the amounts of incorporation of the butyral resin A and the epoxidized linseed oil A were changed.

Example 4

A composition for reflective film was prepared in the same manner as in Example 1. However, in Example 4, an epoxidized soybean oil (trade name: "O-130P", manufactured by Adeka Corp.; oxirane oxygen concentration 6.9%) was used instead of the epoxidized linseed oil A.

Examples 5 and 6

Compositions for reflective film were prepared in the same manner as in Example 1. However, in Examples 5 and 6, the same epoxidized soybean oil as that used in Example 4 was used instead of the epoxidized linseed oil A, and the amount of incorporation of the butyral resin A was changed.

Example 7

A composition for reflective film was prepared in the same manner as in Example 1. However, in Example 7, a polyvinyl butyral resin B (trade name: "S-LEC BH-3", manufactured by Sekisui Chemical Co., Ltd.; molecular weight $11 \times 10^4$) was used instead of the polyvinyl butyral resin A, and the amount of incorporation of the epoxidized linseed oil A was changed.

Example 8

A composition for reflective film was prepared in the same manner as in Example 1. However, in Example 8, the polyvinyl butyral resin B was used instead of the polyvinyl butyral resin A, the same epoxidized soybean oil as that used in Example 4 and the like was used instead of the epoxidized linseed oil A, and a rutile type titanium oxide B (trade name: "CR-60", manufactured by Ishihara Sangyo Kaisha, Ltd.; average particle size 0.21 μm) was used instead of the titanium oxide A.

Example 9

A composition for reflective film was prepared in the same manner as in Example 1. However, in Example 9, a polyvinyl butyral resin C (trade name: "S-LEC BL-1", manufactured by Sekisui Chemical Co., Ltd.; molecular weight $1.9 \times 10^4$) was used instead of the polyvinyl butyral resin A, and the amount of incorporation of the epoxidized linseed oil A was changed.

Example 10

A composition for reflective film was prepared in the same manner as in Example 1. However, in Example 10, an epoxidized linseed oil B (oxirane oxygen concentration 2%) was used instead of the epoxidized linseed oil A, and the amount of incorporation of the polyvinyl butyral resin A was changed.

Comparative Example 1

A composition for reflective film was prepared in the same manner as in Example 1. However, in Comparative Example 1, not only the epoxidized linseed oil A but also any epoxidized vegetable oil was not incorporated. Furthermore, the amount of incorporation of the polyvinyl butyral resin A was changed.

Comparative Example 2

A composition for reflective film was prepared in the same manner as in Example 1. However, in Comparative Example 2, not only the epoxidized linseed oil A but also any epoxidized vegetable oil was not incorporated. Furthermore, the polyvinyl butyral resin B was used instead of the polyvinyl butyral resin A.

Tests (1) Evaluation of Dispersibility Using Grind Gauge

The dispersion state of titanium oxide in each composition was checked using a grind gauge according to NS K5600.

(2) Measurement of Viscosity

The viscosity of each composition at 25° C. was measured using a type E viscometer (manufactured by Toki Sangyo Co., Ltd.).

(3) Measurement of Particle Size Distribution

The average particle size was measured by a laser diffraction method. Specifically, the measurement was carried out using a SALD-DS21 type analyzer (trade name) manufactured by Shimadzu Corp. and using hexane as a dispersion medium.

(4) Evaluation of Film Forming Property

Each composition was applied on a glass substrate to form a coating film, and a microscopic observation was made on the surface of the coating film. Thus, an observation was made on the generation of voids, the presence or absence of the generation of peeled sites, and the uniformity of the coating film.

(5) Crosscut Test

In order to evaluate the adhesiveness of the coating film to the glass substrate, an adhesiveness test was carried out according to a crosscut method.

(6) Measurement of Indentation Modulus of Coating Film

As the measurement of elastic modulus of the coating film, measurement of the indentation modulus was carried out by a test mode loading-unloading test using a dynamic ultramicrohardness meter DUH-211S (manufactured by Shimadzu Corp.), and the elastic modulus at a testing force of 200 mN was calculated.

(7) Measurement of Surface Hardness of Coating Film

The surface hardness of the coating film was measured using a plastic hardness Type A.

(8) Measurement of Amount of Warpage of Substrate

Each of the compositions of the Examples and Comparative examples was applied in the reflective film-applied area (each edge measuring 70 mm) on a silicon wafer using a dispenser, and the composition was dried. Subsequently, at a film thickness of 130 μm, the warpage of the substrate was measured using a Talysurf, which is a surface roughness meter.

(9) Evaluation of Storage Stability

The composition for reflective film was left to stand under the conditions of 25° C., and the date at which the viscosity reached a value that was two-fold the initial viscosity, was investigated.

(10) Observation of External Appearance after Film Formation on Scintillator Layer A scintillator layer composed of CsI:Tl was formed on a glass substrate, and a reflective film made from each of the compositions of the Examples and Comparative Examples was formed thereon. Then, an observation was made on the external appearance of each of such samples.

(11) Presence or Absence of Peeling of Scintillator Layer

For each of the samples used in the above item (10), an observation was made on whether the scintillator layer was peeled off from the glass substrate side.

(12) Measurement of Luminance and Resolution

A scintillator layer composed of CsI:Tl was formed on a glass substrate, and a reflective film was formed thereon using each of the compositions of the Examples and Comparative Examples. Subsequently, a sealing agent was applied along the periphery of the glass substrate using a dispenser, a cap made of an aluminum alloy having a thickness of 80 μm was covered over the sealing agent, and curing was carried out at a pressure of 20 g/cm$^2$ under the UV irradiation conditions of 72 mW/cm$^2$ for 120 seconds. The UV irradiation was carried out from the glass substrate side. Finally, a heat treatment at 80° C. for one hour was carried out, and thus a simplified sample assembling an X-ray detector was produced.

Using such a sample, the luminance and resolution were measured. The measurement of luminance and resolution was carried out using a method of allowing an X-ray to enter from the reflective film side, focusing on the interface between the substrate and the CsI:Tl film on the substrate side, and measuring an X-ray image using a CCD camera.

The irradiation with an X-ray was carried out under the conditions of an accelerating voltage of 70 kV-1 mA. Under the conditions of having an aluminum filter for soft X-ray removal, an analysis was made on the contrast transfer function (CTF) which represents an index of how distinct is the brightness and darkness in an X-ray image was measured using a resolution chart for fineness, which includes 2 pairs of lines and spaces disposed at an interval of 1 mm, and the changes relative to the initial value was defined as the maintenance ratio. The luminance was determined by using a relative luminance with respect to a sensitized paper defined as the standard, and the resolution was determined by imaging processing of the value of the CTF at 2 Lp/mm on the resolution chart image.

(13) Reliability Tests

A scintillator layer was formed on a 17-inch glass substrate (trade name: "Corning 1737", manufactured by Corning, Inc.), and a reflective film was formed thereon using each of the compositions of the Examples and Comparative Examples. This sample was produced in 20 samples each, and the samples were subjected to an x-ray exposure test, a cold-heat impact test, and a high temperature high humidity test, as reliability tests. Here, the luminance and resolution were measured, and samples having a relative luminance of 2.0 or less with respect to a sensitized paper, and a resolution of 40% or less were defined as defectives.

i) X-Ray Exposure Test

Each sample was irradiated with X-rays at 25000 R, and the number of samples that turned defective due to property changes was measured.

ii) Cold-Heat Impact Test

A test of reciprocating between the conditions of leaving the sample to stand at −20° C. for one hour and the conditions of leaving the sample to stand at 50° C. for one hour (room temperature 5 minutes) was carried out up to 200 cycles, and the number of samples that turned defective was measured.

iii) High Temperature High Humidity Test

The number of samples that turned defective after 1000 hours at 60° C. and a humidity of 90%, was measured.

The results of the above tests are presented in Tables 2 and 3.

TABLE 2

|  | Example 1 | Example 2 | Example 3 | Example 4 | Example 5 | Example 6 | Example 7 | Example 8 | Example 9 | Example 10 | Comparative Example 1 | Comparative Example 2 |
|---|---|---|---|---|---|---|---|---|---|---|---|---|
| Grind gauge (μm) | <10 | <10 | <10 | <10 | <10 | <10 | <10 | <10 | <10 | <10 | <10 | <10 |
| Viscosity (25° C., mPa · s) | 8310 | 7420 | 4910 | 6830 | 4650 | 3430 | 4280 | 3970 | 4200 | 4520 | 22000 | 20100 |
| Particle size distribution (average particle size μm) | 0.3 | 0.4 | 0.3 | 0.5 | 0.4 | 0.4 | 0.4 | 0.3 | 0.7 | 1.2 | 0.5 | 0.6 |
| Film forming property | ○ | ○ | ○ | ○ | ○ | ○ | ○ | ○ | Δ | x | ○ | ○ |
| Crosscut test | 0/100 | 0/100 | 0/100 | 0/100 | 0/100 | 0/100 | 0/100 | 0/100 | 98/100 | 100/100 | 0/100 | 0/100 |
| Indentation modulus (N/mm$^2$) | 15000 | 6000 | 4500 | 13000 | 5600 | 3400 | 4100 | 3800 | 4100 | 3600 | 18000 | 16000 |
| Surface hardness of coating film | 68 | 53 | 52 | 54 | 43 | 41 | 45.2 | 47 | 57 | 43 | 94 | 97 |
| Warpage of substrate (μm) | 68 | 13 | 2 | 65 | 43 | 4 | 5 | 5 | 57 | 43 | 194 | 197 |
| Storage stability (number of days) | 100 or more | 100 or more | 100 or more | 100 or more | 100 or more | 100 or more | 100 or more | 100 or more | 100 or more | 28 | 100 or more | 100 or more |
| External appearance after film formation on scintillator layer | ○ | ○ | ○ | ○ | ○ | ○ | ○ | ○ | x | ○ | x | x |
| Presence or absence of peeling of scintillator layer | Absent | Absent | Absent | Absent | Absent | Absent | Absent | Absent | Present | Present | Present | Present |

TABLE 3

|  |  | Example 1 | Example 2 | Example 3 | Example 4 | Example 5 | Example 6 | Example 7 | Example 8 | Example 9 | Example 10 | Comparative Example 1 | Comparative Example 2 |
|---|---|---|---|---|---|---|---|---|---|---|---|---|---|
| Relative luminance | | 2.5 | 2.5 | 2.6 | 2.6 | 2.5 | 2.6 | 2.5 | 2.6 | 1.1 | 1.0 | 2.5 | 2.4 |
| Resolution (%) | | 45 | 47 | 45 | 44 | 46 | 45 | 43 | 45 | 12 | 15 | 45 | 42 |
| X-ray exposure test | | 0/20 | 0/20 | 0/20 | 0/20 | 0/20 | 0/20 | 0/20 | 0/20 | 10/20 | 12/20 | 13/20 | 18/20 |
| Cold-heat impact test (number of samples) | 20 Cycles | 0/20 | 0/20 | 0/20 | 0/20 | 0/20 | 0/20 | 0/20 | 0/20 | 10/20 | 12/20 | 20/20 | 20/20 |
| | 50 Cycles | 0/20 | 0/20 | 0/20 | 0/20 | 0/20 | 0/20 | 0/20 | 0/20 | 20/20 | 20/20 | — | — |
| | 100 Cycles | 0/20 | 0/20 | 0/20 | 0/20 | 0/20 | 0/20 | 0/20 | 0/20 | — | — | — | — |
| | 200 Cycles | 0/20 | 0/20 | 0/20 | 0/20 | 0/20 | 0/20 | 0/20 | 0/20 | — | — | — | — |
| High temperature high humidity test (number of samples) | After 100 hours | 0/20 | 0/20 | 0/20 | 0/20 | 0/20 | 0/20 | 0/20 | 0/20 | 20/20 | 20/20 | 20/20 | 20/20 |
| | After 200 hours | 0/20 | 0/20 | 0/20 | 0/20 | 0/20 | 0/20 | 0/20 | 0/20 | — | — | — | — |
| | After 500 hours | 0/20 | 0/20 | 0/20 | 0/20 | 0/20 | 0/20 | 0/20 | 0/20 | — | — | — | — |
| | After 1000 hours | 0/20 | 0/20 | 0/20 | 0/20 | 0/20 | 0/20 | 0/20 | 0/20 | — | — | — | — |

From these results, it was confirmed that the compositions of the Examples are excellent in the performance of the coating film, adhesiveness and storage stability, and can suppress the occurrence of warpage of the substrate. Furthermore, it was confirmed that the X-ray detector produced by using the compositions of the Examples have excellent luminance and resolution properties, do not have the occurrence of property deterioration in the reliability tests, and have excellent performances. Therefore, it was confirmed that the compositions of the Examples are suitable for the use in reflective films as compared with the compositions of the Comparative Examples.

EXPLANATION OF REFERENCE NUMERALS

1 X-ray detector
3 Glass substrate
5 Photodiode
6 Thin film transistor
15 Scintillator layer
16 Reflective layer

What is claimed is:

1. An X-ray detector comprising:
   a substrate;
   a photoelectric conversion element which is formed on the substrate and which converts incident light to signal charges;
   a scintillator layer which is formed on the photoelectric conversion element and which converts incident X-ray to fluorescence; and
   a reflective film which is formed on the scintillator layer using a composition for reflective film, and which reflects the fluorescence radiated from the scintillator layer,
   wherein the composition comprises a polyvinyl acetal resin; an epoxidized vegetable oil; a solvent; a silane coupling agent; and titanium oxide in an amount of at least 50% by weight of the total solids content, the solids content being components of the composition except the solvent.

2. The X-ray detector according to claim 1, wherein the epoxidized vegetable oil is an epoxidized linseed oil.

3. The X-ray detector according to claim 2, wherein the epoxidized linseed oil has an oxirane oxygen concentration of 5% or greater.

4. The X-ray detector according to claim 2, wherein the epoxidized linseed oil is present in an amount of 0.5% to 30% by weight of the total solids content.

5. The X-ray detector according to claim 1, wherein the polyvinyl acetal resin is a polyvinyl butyral resin.

6. The X-ray detector according to claim 5, wherein the weight average molecular weight of the polyvinyl butyral resin is equal to or more than $3 \times 10^4$.

7. The X-ray detector according to claim 1, wherein the coupling agent is an epoxysilane.

8. The X-ray detector according to claim 7, wherein the epoxysilane coupling agent is at least one of 2-(3,4-epoxycyclohexyl)ethyltrimethoxysilane, 3-glycidyloxypropyl(dimethoxy)methylsilane, 3-glycidyloxypropyltrimethoxysilane, 3-glycidyloxypropyltriethoxysilane, 3-glycidyloxypropylmethyldimethoxysilane, and diethoxy(3-glycidyloxypropyl)methylsilane.

9. The X-ray detector according to claim 1, wherein the average particle size of the titanium oxide is equal to or less than 5 μm.

10. The X-ray detector according to claim 1, wherein the titanium oxide has a rutile crystal structure.

11. The X-ray detector according to claim 1, wherein the titanium oxide is present in an amount of 50% to 98% by weight of the total solids content.

12. The X-ray detector according to claim 1, wherein the titanium oxide is present in an amount of 70% to 98% by weight of the total solids content.

13. The X-ray detector according to claim 1, wherein the solvent is at least one of cyclohexanone, methylcyclohexanone, toluene, and xylene.

14. The X-ray detector according to claim 1, wherein the polyvinyl acetal resin is present in an amount of 5% to 30% by weight of the total solids content.

* * * * *